United States Patent [19]
Weiss

[11] Patent Number: 5,583,875
[45] Date of Patent: Dec. 10, 1996

[54] AUTOMATIC PARAMETRIC SELF-TESTING AND GRADING OF A HARDWARE SYSTEM

[75] Inventor: David Weiss, Palo Alto, Calif.

[73] Assignee: Siemens Rolm Communications Inc., Santa Clara, Calif.

[21] Appl. No.: 345,883

[22] Filed: Nov. 28, 1994

[51] Int. Cl.⁶ ................................................ G06F 11/00
[52] U.S. Cl. .................................... 371/28; 395/183.05
[58] Field of Search .......................... 371/28, 25.1, 24; 324/73.1; 369/58; 395/183.08

[56] References Cited

U.S. PATENT DOCUMENTS

| | | | |
|---|---|---|---|
| 4,623,837 | 11/1986 | Efron et al. | 324/77 R |
| 5,030,905 | 7/1991 | Figal | 324/158 R |
| 5,438,599 | 8/1995 | Lincoln | 377/20 |

*Primary Examiner*—Vincent P. Canney

[57] ABSTRACT

Automatic parametric testing of a system can be achieved by varying a parameter such as speed, voltage, and/or temperature, and then monitoring system performance. Such testing can be used to determine whether a given system meets specifications and performance variations from system to system.

26 Claims, 6 Drawing Sheets

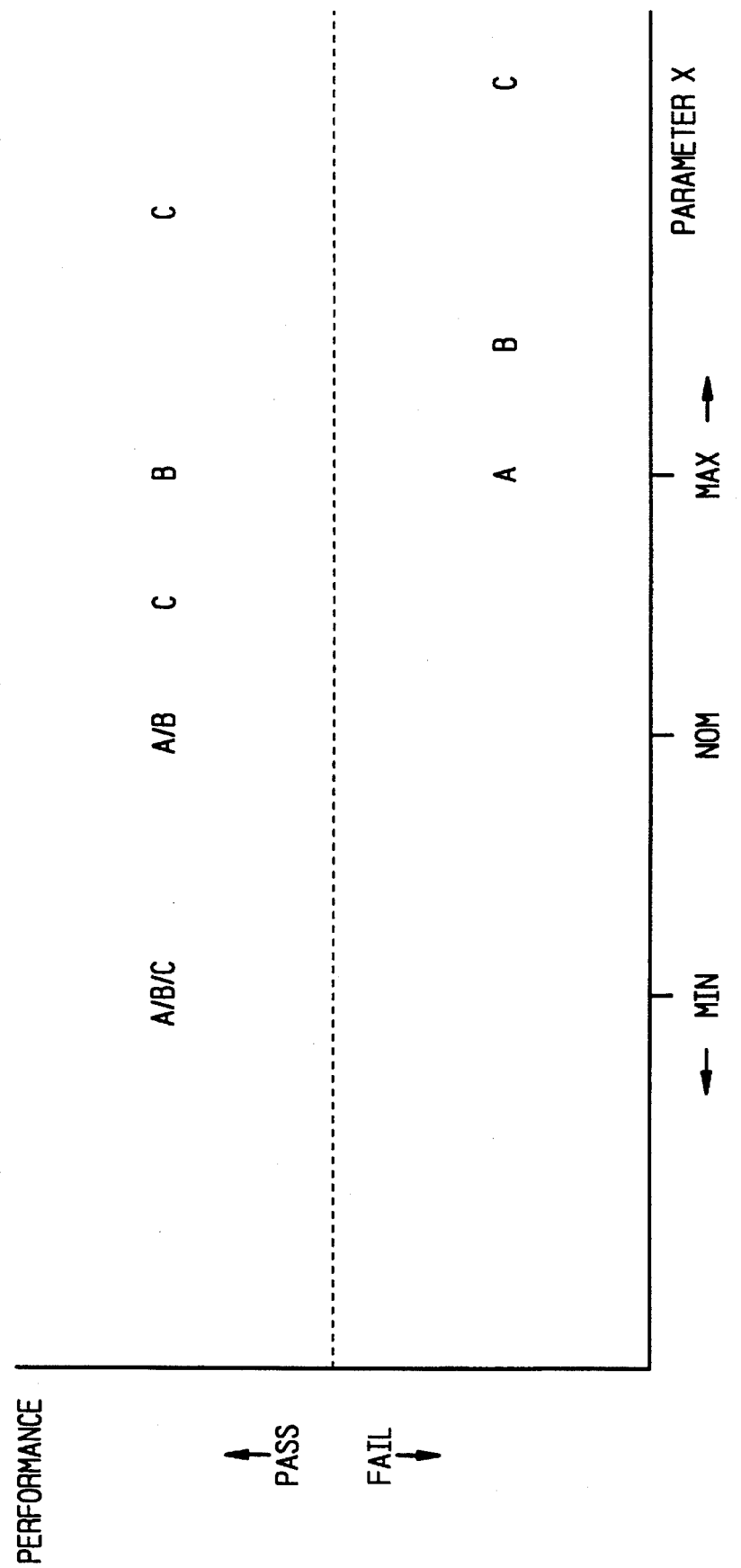

AUTOMATIC PARAMETRIC SELF-TESTING AND GRADING OF A HARDWARE SYSTEM

FIELD OF THE INVENTION

This invention relates generally to testing. Specifically, the invention relates to methods and apparatus for testing a system over a desired performance range.

BACKGROUND OF THE INVENTION

The components used in electronic equipment, both active and passive, exhibit performance characteristics that vary with speed or operating frequency, voltage, and temperature. Presumably, all components are tested to confirm that they function properly and meet their respective specifications, prior to insertion in a system.

Within a system, individual components may introduce delays that cumulatively affect the system's overall performance. Although one could mathematically combine all of the individual delays in some fashion to predict performance, it would be more accurate to directly measure performance of the system as a whole.

To more precisely predict such performance, two different kinds of parametric testing may be employed. One concerns performance over a predetermined, fixed range. Here, the question is whether the system (or some other unit or subset of the system) can function over the expected range of parameters, such as speed or frequency, voltage, and temperature—essentially a pass/fail system. One goal of this scheme is to determine reliability under worst-case conditions.

A second type of testing permits one to differentiate performance variations usually found among otherwise-identical components or sub-systems. Given the variation in performance of individual components discussed above, one could expect a similar variation in the performance of an entire system.

Typically, parametric testing is performed manually or semi-automatically using special tools or test sets. Either of these approaches is costly. Manual testing requires documentation and training. In the case of semi-automatic testing, an investment in specially-designed test apparatus may not be cost-justified where the sales volume is low.

It would be desirable to provide a method and an apparatus to automatically test the overall performance of a system under variations of speed, voltage, and/or temperature. It is also desirable to provide a method that could be used to gradate individual units of the same kinds of system, again based on one or more performance specifications and/or parameters.

In addition to testing, it would also be desirable to detect system performance failures.

SUMMARY OF THE INVENTION

These and other objects are achieved by a method of varying parameters such as operating frequency or speed, voltage, and temperature applied to a system under test, and then monitoring the overall performance of the system. For example, to vary the speed, the system clock frequency can be altered. For purposes of explanation, the following examples will use speed or frequency as the variable parameter.

Another aspect of the tests described here is the graduation of testing from subsystem level (i.e., one level above individual components) through increasingly larger subsets of a system until a test of the overall system is achieved. In that way, failures and unacceptable performance can be isolated at the proper level.

For the first type of testing, i.e., pass/fail, the unit under test is operated at a low frequency, a high frequency, and possibly a nominal frequency. The low and high frequencies represent the lower and upper boundaries, respectively, of the nominal operating range of the unit. The performance is monitored and, if the specifications are met, the unit passes.

Collectively, those units passing the first test will likely exhibit a wide variation in performance and tolerance in response to changes in the operating speed. As noted above, it may be desirable to grade units by their performance. To do that, the boundaries of minimum acceptable performance are determined for each unit. These are located by beginning at some nominal value of speed and then incrementing and decrementing from that value until failure or below-specification performance occurs. Armed with the operating range for each unit, one can grade the units with respect to each other.

Several benefits are afforded by the methods described here. First, the testing can be done automatically at intervals and/or times determined by the user. Second, since the scheme can be configured to use circuitry already incorporated in the unit or system under test, manufacturing costs are lower and the time needed for testing is shorter, as all testing can be performed as units exit the production line without the need for external test equipment. Finally, the testing can be done on-site wherever the unit or system is located.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein:

FIG. 6 is a plot of performance vs. a variable parameter illustrating the grading scheme.

DETAILED DESCRIPTION OF THE INVENTION

In the examples discussed here, the varied parameter is speed or frequency. Of course, one could choose to vary other parameters such as supply voltage or temperature, and others not mentioned here.

Figure 1:
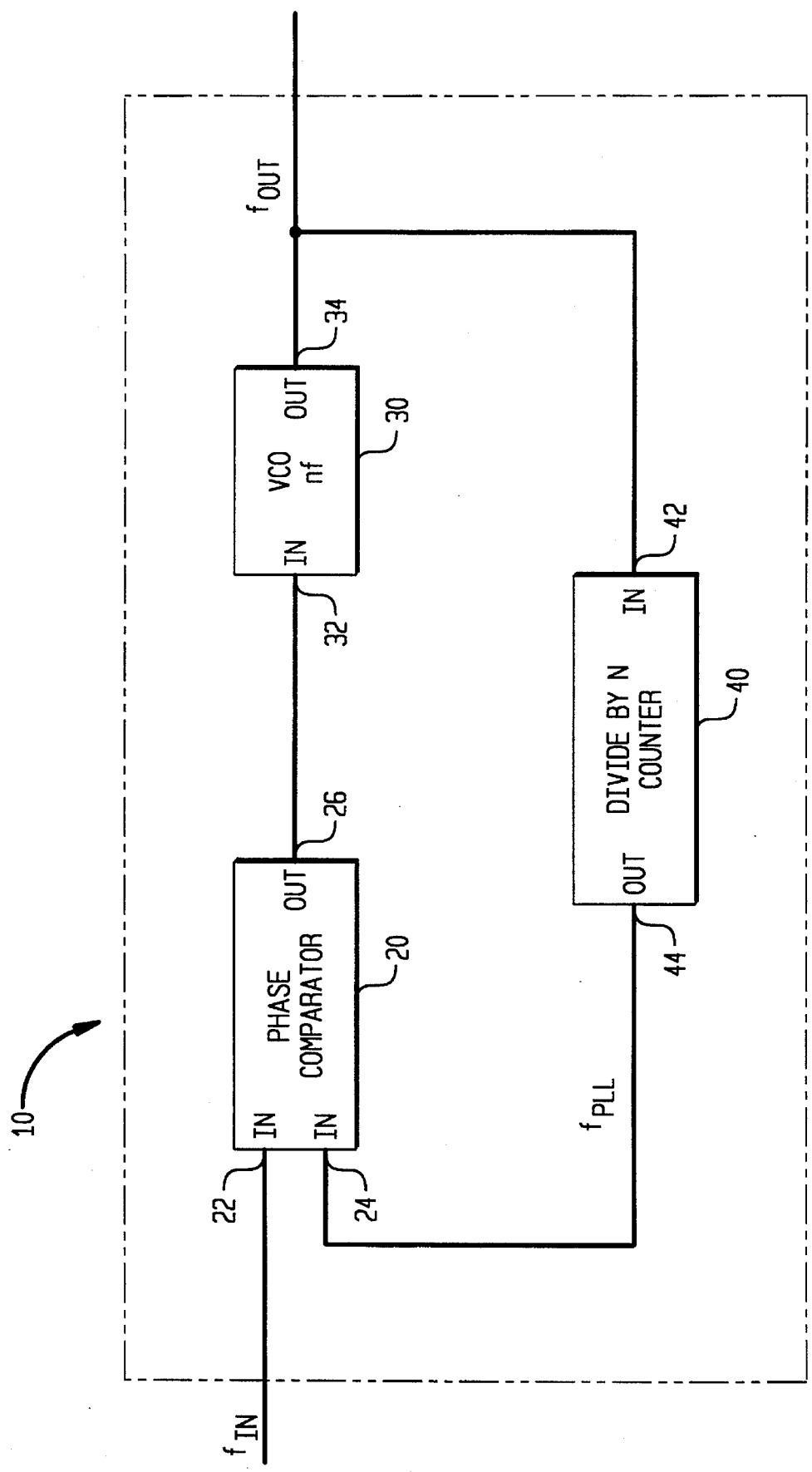
FIG. 1 is a schematic diagram of a phase-locked loop.

A phase-locked loop circuit (PLL) 10 is shown in FIG. 1. The circuit 10 has a phase comparator 20, a voltage-controlled oscillator (VCO) 30, and a divider 40. The PLL 10 can be internal to the system under test. It should be noted that the entire testing apparatus, hardware, software, and/or firmware, can be an intrinsic part of the system under test. Moreover, the software and/or firmware can be written to provide essentially automatic operation.

The phase comparator 20 has two inputs: a reference clock $f_{in}$ input 22 and a feedback input 24. The phase comparator 20 provides an output 26 to an input 32 to the VCO 30. The VCO 30 has an output 34 that provides an output frequency signal $f_{out}$ to the input 42 of the divider; the output 44 of the divider 40 is in turn provided to the feedback input 24 of the phase comparator 20.

In operation, the output frequency signal $f_{out}$ of the VCO 30 is divided down by the divider 40 by a divider constant N to $f_{out}/N$, or $f_{PLL}$, the phase lock frequency. This signal is compared to the reference clock $f_{in}$ 22 and the difference is applied to the input 32 of the VCO 30, driving the VCO 30 to a stable frequency.

Figure 2:
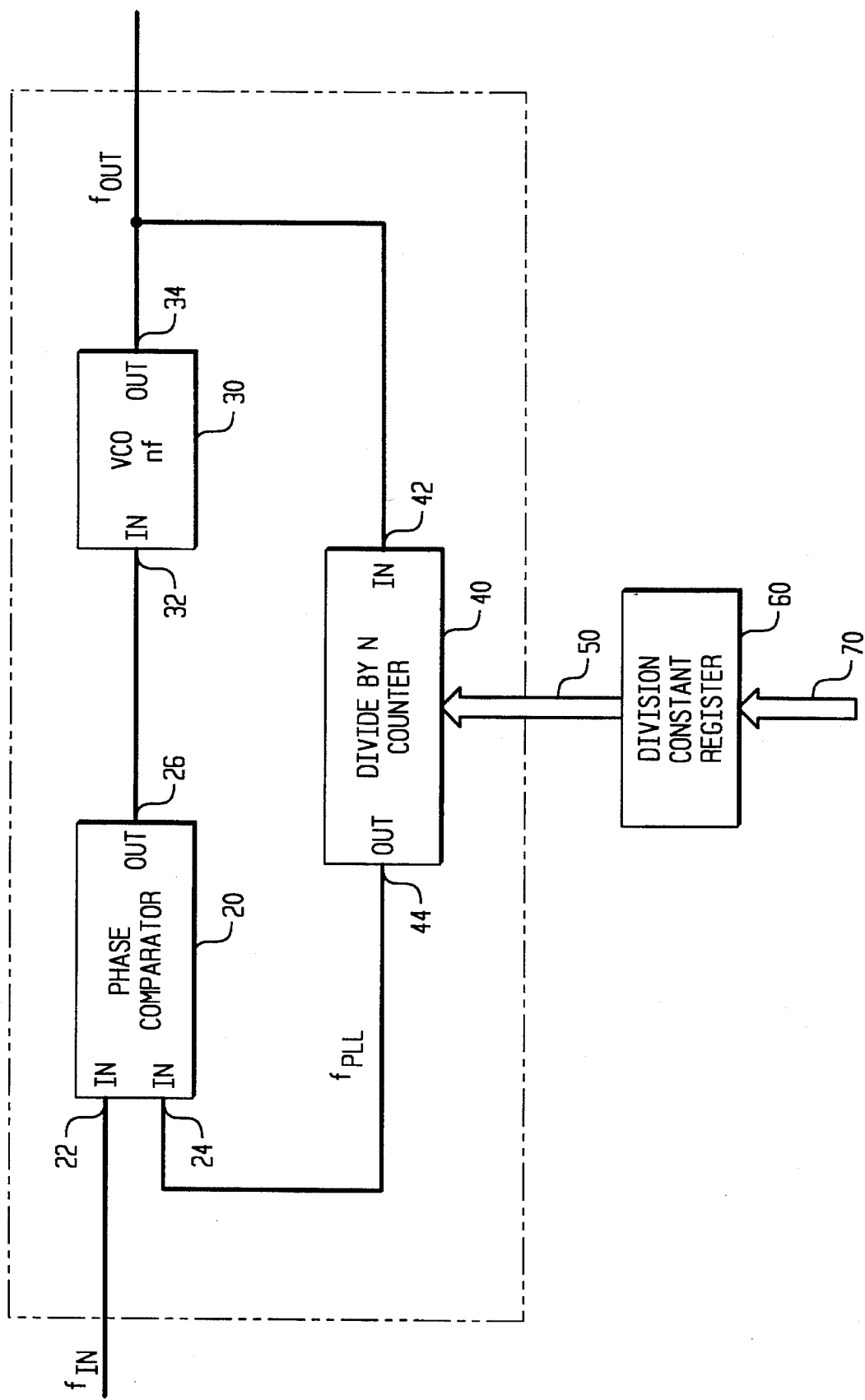
FIG. 2 is a schematic diagram of a programmable phase-locked loop.

To vary the operating frequency of a hypothetical system under test, the output frequency of the PLL 10 must be changed. One way of achieving this is through a divider control input 50, as shown in FIG. 2. The divider control input 50 as configured here provides the division constant N, held in a division constant register 60. The register 60 can be supplied with the actual value of N from a microprocessor data bus 70. Firmware or a software program can be used to supply the data to the bus 70.

To run a pass/fail test, the value resident in the division constant register 60 is variously set to provide an operational frequency of the minimum, the maximum, and perhaps the center or optimal frequencies of the desired range. At each frequency, the system (or portion thereof) under test is monitored for performance. If the performance is within the minimum acceptable specification, the system passes.

Figure 3:
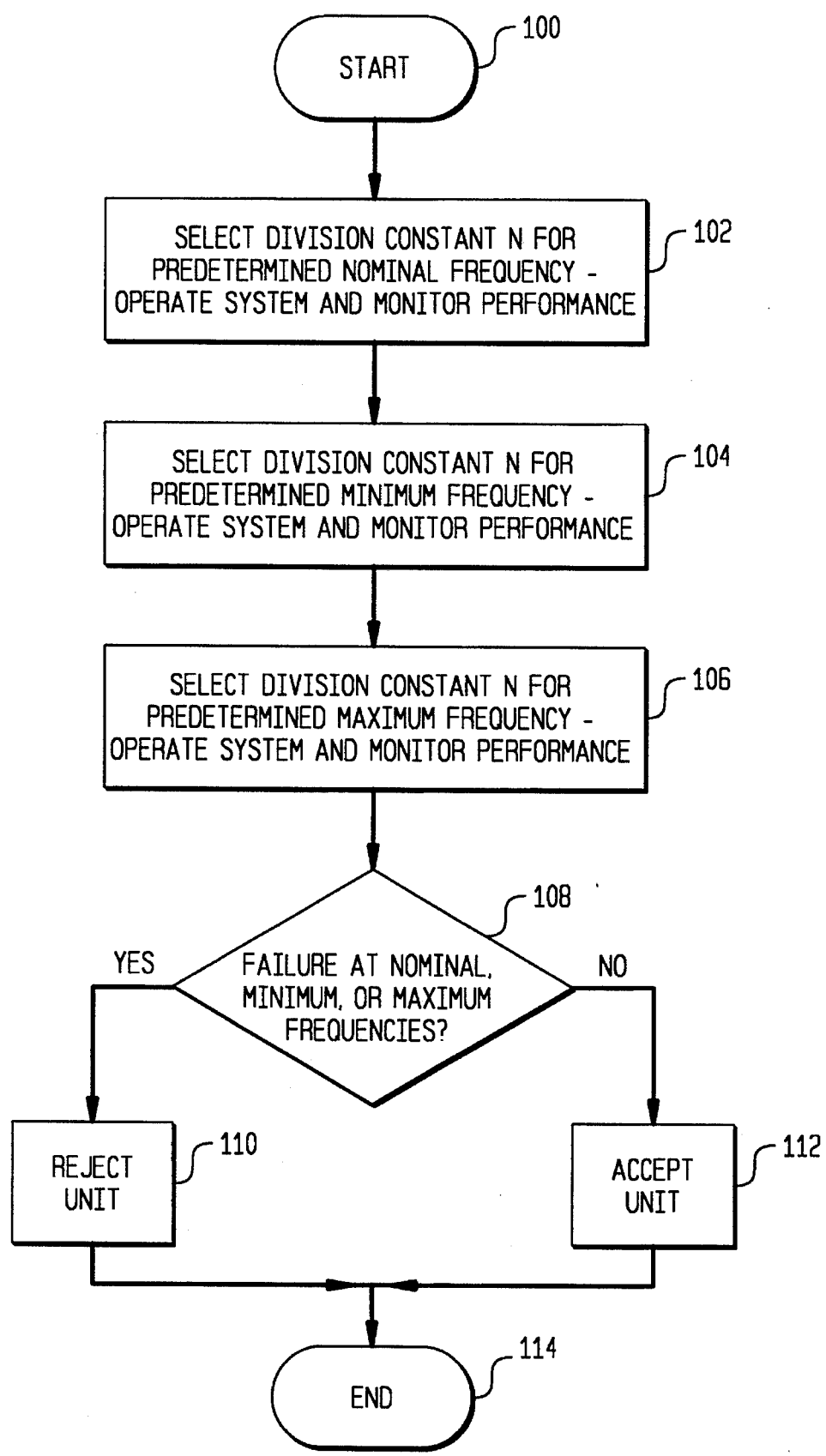
FIG. 3 is a flow chart of the operation of the parametric testing method.

A routine for conducting the pass/fail test is shown in the flow chart of FIG. 3. (The numbers in parentheses refer to the steps in the flow chart.) At the start (100), an initial division constant N is selected (102). The initial value of the division constant represents a predetermined nominal frequency of operation. The system is then operated (102) with the PLL at a frequency of $f_{PLL}$, or $f_{out}/N$, while the system is monitored and performance characteristics of interest are recorded.

The division constant N is then changed to generate a predetermined minimum frequency and the system is again operated and monitored (104). Finally, the division constant N is again changed to generate a predetermined maximum frequency and the system is once again and monitored (106). It should be recognized that the first step (102) can be eliminated at the user's option, relying solely on the performance at the low and high frequency boundaries as an indicator of proper performance. If the system operates within predetermined specifications at each of the test frequencies, then it passes (108, 112) or if not, it is rejected (110). This completes the pass/fail test (114).

Figure 4:
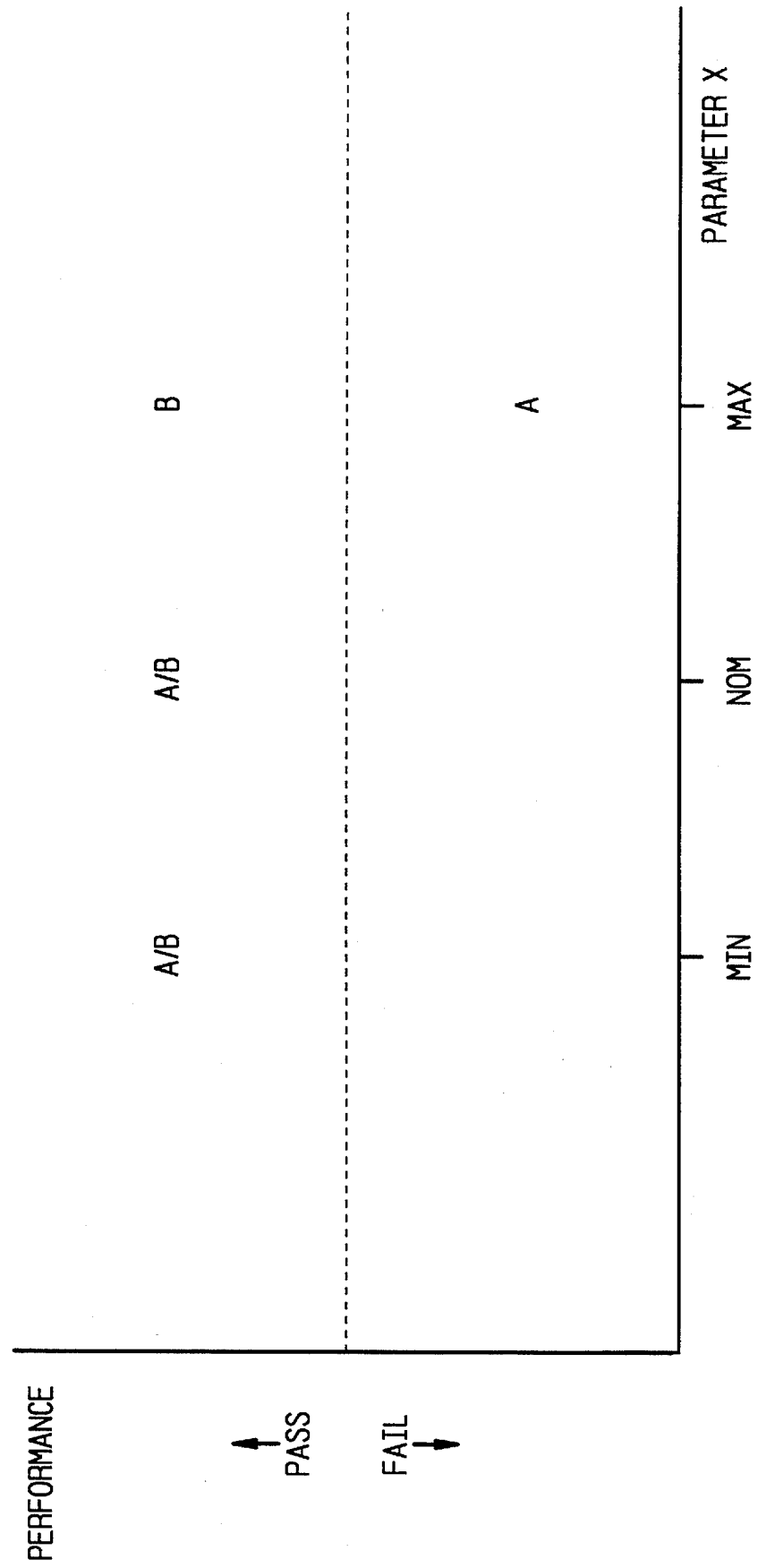
FIG. 4 is a performance vs. frequency plot illustrating the pass/fail test.

A hypothetical plot of the performance of a system that passes the test is shown in FIG. 4. As can be seen, the vertical axis represents the system's performance; the horizontal axis represents a parameter X such as frequency. The minimum acceptable level of performance is shown by a dotted line, and the actual performance points are denoted by letters. In the example shown, two units "A" and "B" have been tested. At the three test frequencies, "min," "nom," and "max," unit "B" has passed, but "A" has failed at the maximum frequency. Thus, unit "B" passes while unit "A" must be discarded or repaired.

It should be recognized that the performance shown in FIG. 4 represents the behavior of a digital system. As opposed to analog devices, the units behave in a binary fashion, either they function properly or they don't. Therefore, the plot is linear. If the unit was an analog device, the plot would likely be non-linear.

Systems can also be graded by overall performance, e.g., low speed, moderate speed, and high speed. As with individual components, such as memories and microprocessors, systems exhibit a gradation in response, describing a Gaussian distribution (normal curve). The apparatus of FIG. 2 can again be used to determine the relative performance of a group of otherwise-identical systems. A routine for performing this test is shown in the flow chart of FIG. 5.

Figure 5:
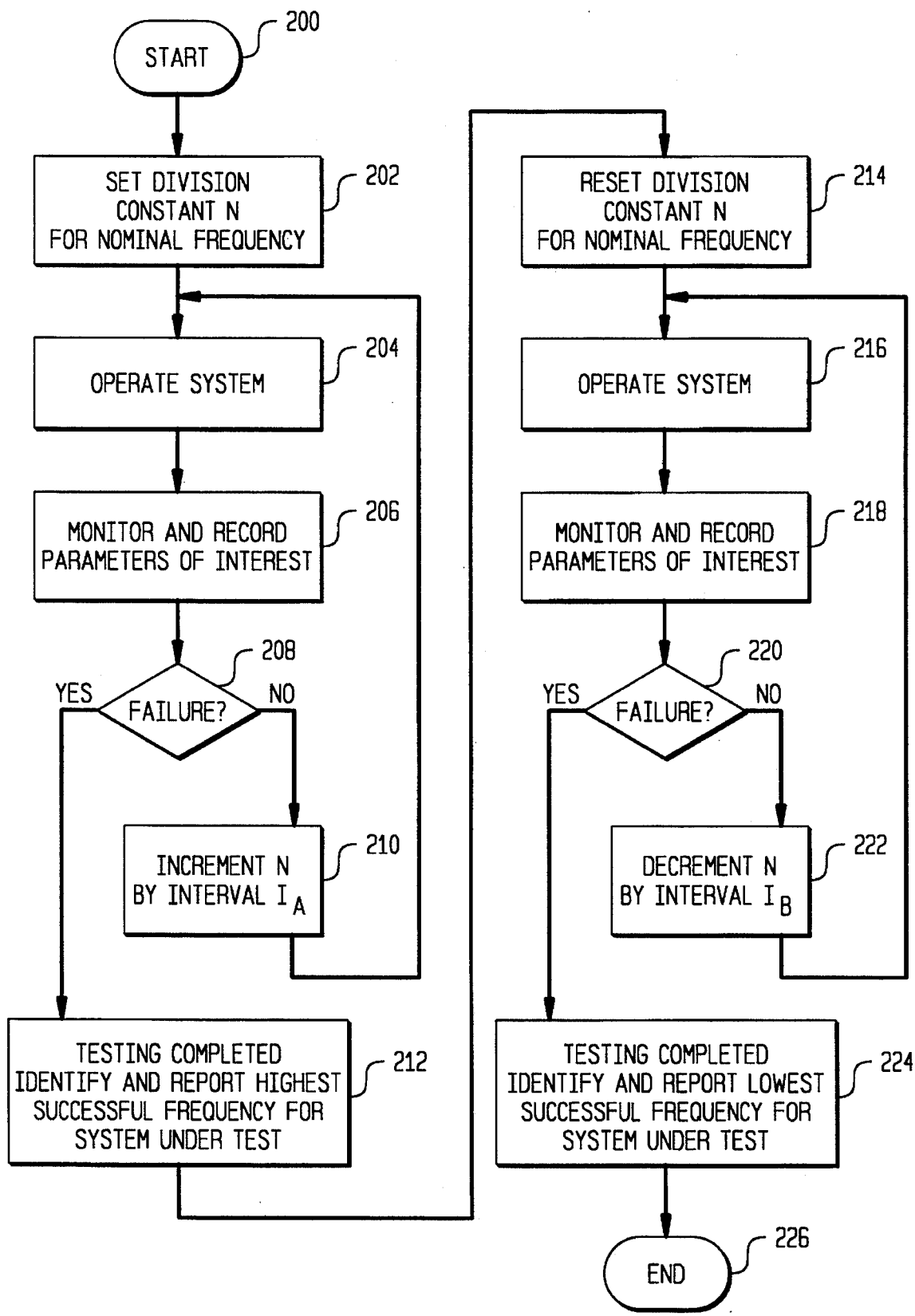
FIG. 5 is a flow chart of the operation of the grading method.

Referring to the flow chart in FIG. 5, the test starts (200) with the initial setting of the division constant N representing a predetermined nominal frequency of operation (202). The system is then operated (204) with the PLL at a frequency of $f_{PLL}$, or $f_{out}/N$, while the system is monitored and performance characteristics of interest are recorded (206). If there is a failure (208), this portion of the test ends and the failure is noted (212). Otherwise, the division constant N is incremented by an interval $I_A$ (210) and the testing is repeated at the new frequency (204, 206). It should be understood that the value of interval $I_A$ is not fixed and can itself be varied. Again, the operation is checked (208) and the sequence is either repeated (210, 204, 206) or the testing is completed (212) and the highest successful operating frequency is reported.

Next, the routine searches for the lowest acceptable operating frequency. The division constant N is reset to the predetermined nominal frequency of operation (214). The system is then operated (216) with the PLL at a frequency of $f_{out}/N$, while being monitored and performance characteristics of interest are recorded (218). If there is a failure (220), this portion of the test ends and the failure is noted (224). Otherwise, the division constant N is decremented by an interval $I_B$ (222) and the testing is repeated at the new frequency (216, 218). It should be understood that the value of interval $I_B$ is not fixed and can itself be varied. Again, the operation is checked (220) and the sequence is either repeated (222, 216, 218) or the testing is completed (224) and the lowest successful operating frequency is reported, ending the routine (226).

A hypothetical plot of the system's performance for grading purposes is shown in FIG. 6. As with the plot of FIG. 4, the vertical axis represents the system's performance; the horizontal axis represents a parameter X such as frequency. In addition to the performance of units "A" and "B," a third unit "C" has been tested. The frequency has been increased for all units until there is a failure; unit "B" has failed at one point above "max" and unit "C" has failed (and thus passes) at an even higher point. Given this dam, the three units can be ranked by absolute performance. For a margin of safety, the user may wish to add in a buffer zone on either side of the actual performance range.

To accommodate the required frequencies, the locking range of the PLL 10 must be capable of providing the corresponding range. Further, given that the delay values for semiconductors are typically about two-thirds of the guaranteed maximum delay, a system should operate at approximately fifty percent faster than the intended nominal speed, while in the worst case, the performance will exhibit an operating speed of thirty-three percent slower. Also, the operating speed will vary with the ambient temperature, applied supply voltage. $V_{cc}$, and semiconductor process variations. Thus, the PLL 10 should be capable of operating over a range of −33% to +50% of the desired operating frequency.

The testing can be performed at the start-up of a system, at preset intervals of time (automatically or in response to some other internal trigger), or at other times determined by the user. A reporting system can provide a performance report detailing operating frequency against any number of operating conditions. By running the test in this manner, the user can determine both reliability as well as relative performance compared to other similar systems. To avoid loss of reported data, the data could be recorded in a RAM, which could be power-failure protected, using unique encoding. The unique encoding will enable the system to distinguish between a start-up at power-on and a restart routine following a failure resulting from the occurrence where the performance limits of the system under test are exceeded.

The testing routines described here can be applied to progressively greater levels of any given system as part of a comprehensive test, beginning with the circuits, then modules, followed by a subsystem, gradually expanding the scope until the entire system is under test. In this way, the faults can be isolated to a reasonably compact area, allowing one to redesign or correct any design errors rapidly with minimal troubleshooting. This concept of an expanding nucleus is especially helpful given the uncertainties in the interaction among hardware, firmware, and software, and the presence of critical timing paths which may not be apparent to the designer.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An apparatus for testing a system according to one or more performance characteristics with respect to at least one variable parameter, comprising:

means for selecting a plurality of values of the parameter;

means for operating the system at each value of the parameter; and means for monitoring at least one performance characteristic at each value of the parameter:

wherein the means for operating and the means for monitoring are an intrinsic part of the system.

2. An apparatus as set forth in claim 1, where the variable parameter is speed.

3. An apparatus as set forth in claim 1, where the variable parameter is temperature.

4. An apparatus as set forth in claim 1, where the variable parameter is voltage.

5. An apparatus as set forth in claim 1, further including means for recording the performance characteristics at each value of the parameter.

6. An apparatus as set forth in claim 5, wherein the means for recording the performance characteristics includes means for uniquely recording the performance characteristics.

7. An apparatus as set forth in claim 1, wherein the means for selecting a plurality of values of the parameter includes means for selecting predetermined minimum and maximum values of the parameter.

8. An apparatus as set forth in claim 1, wherein the means for monitoring at least one performance characteristic at each value of the parameter includes means for rejecting the system.

9. An apparatus as set forth in claim 1, wherein the means for selecting includes means for increasing the value of the parameter until the system fails and means for decreasing the value of the parameter until the system fails.

10. An apparatus as set forth in claim 9, wherein the means for increasing the values of the parameter includes means for selecting an interval for increasing the value of the parameter; and the means for decreasing the value of the parameter until the system fails includes means for selecting an interval for decreasing the value of the parameter.

11. An apparatus as set forth in claim 1, wherein the means for selecting a plurality of values of the parameter, the means for operating the system at each value of the parameter, and the means for monitoring at least one performance characteristic at each value of the parameter are intrinsic to the system.

12. An apparatus for evaluating a system according to one or more performance characteristics with respect to operating speed, comprising:

means for operating the systems at a predetermined plurality of speeds;

means for determining at least one performance characteristic at each value of speed; and means for performing an evaluation based on the performance characteristics;. wherein the means for operating, the means for determining and the means for performing are an intrinsic part of the system.

13. An apparatus for determining the highest speed at which a system will function according to at least one performance characteristic, comprising the steps of:

means for operating the system at a plurality of speeds, increasing the operating speed until the system fails;

means for determining the performance characteristic at each of the plurality of speeds; and means for determining the highest speed at which the system will function before failing:

wherein the means for operating, the means for determining the performance characteristics and the means for determining the highest speed are an intrinsic part of the system.

14. A method for testing a system according to one or more performance characteristics with respect to at least one variable parameter, comprising the steps of:

selecting a plurality of values of the parameter;

operating the system at each value of the parameter; and monitoring at least one performance characteristic at each value of the parameter;

wherein the operating and the monitoring are done with hardware and software, the hardware and the Software being an intrinsic part of the system.

15. A method as set forth in claim 14, where the variable parameter is speed.

16. A method as set forth in claim 14, where the variable parameter is temperature.

17. A method as set forth in claim 14, where the variable parameter is voltage.

18. A method as set forth in claim 14, further including the step of recording the performance characteristics at each value of the parameter.

19. A method as set forth in claim 18, wherein the step of recording the performance characteristics at each value of the parameter further includes the step of uniquely recording the performance characteristics.

20. A method as set forth in claim 14, wherein the step of selecting a plurality of values of the parameter includes the step of selecting predetermined minimum and maximum values of the parameter.

21. A method as set forth in claim 14, wherein the step of monitoring at least one performance characteristic at each value of the parameter includes the step of rejecting the system.

22. A method as set forth in claim 14, wherein the step of selecting includes the step of increasing the value of the parameter until the system falls and the step of decreasing the value of the parameter until the system fails.

23. A method as set forth in claim 22, wherein the step of increasing the value of the parameter until the system fails includes the step of selecting an interval for increasing the value of the parameter; and the step of decreasing the value of the parameter until the system fails includes means for selecting an interval for decreasing the value of the parameter.

24. A method as set forth in claim 14, wherein the steps of selecting a plurality of values of the parameter, operating the system at each value of the parameter, and monitoring at least one performance characteristic at each value of the parameter are performed intrinsically to the system.

25. A method for evaluating a system according to one or more performance characteristics with respect to operating speed, comprising steps of:

operating the systems at a predetermined plurality of speeds;

determining at least one performance characteristic at each value of speed; and performing an evaluation based on the performance characteristics;

wherein the operating, the determining, and the performing are done with hardware and software, the hardware and the software being an intrinsic part of the system.

26. A method for determining the highest speed at which a system will function according to at least one performance characteristic, comprising the steps of:

operating the system at a plurality of speeds, increasing the operating speed until the system fails;

determining the performance characteristic at each of the plurality of speeds; and determining the highest speed at which the system will function before failing.

\* \* \* \* \*